United States Patent [19]
Erwin et al.

[11] Patent Number: 5,114,907
[45] Date of Patent: May 19, 1992

[54] CRYOGENIC FLUID LEVEL SENSOR

[75] Inventors: Lewis Erwin, Winnetka; Keith Crandell, Hinsdale, both of Ill.; Justin Whitney, Butte, Mont.

[73] Assignee: Illinois Superconductor Corporation, Evanston, Ill.

[21] Appl. No.: 670,236

[22] Filed: Mar. 15, 1991

[51] Int. Cl.⁵ .................. G01F 23/24; H01L 39/04
[52] U.S. Cl. .......................... 505/1; 73/295; 73/304 R; 338/80; 505/842; 505/847
[58] Field of Search .......... 73/295, 304 R; 505/842, 505/843, 847, 1; 338/94, 151, 222, 80, 156

[56]         References Cited
         U.S. PATENT DOCUMENTS

| 3,496,773 | 2/1970 | Cornish | 73/295 |
| 3,943,767 | 3/1976 | Efferson | 505/842 |
| 4,118,984 | 10/1978 | Kuraoka et al. | 73/295 |
| 4,566,323 | 1/1986 | Masumoto et al. | 73/295 |
| 4,655,079 | 4/1987 | Masumoto et al. | 73/295 |
| 4,745,806 | 5/1988 | Masumoto et al. | 73/295 |
| 4,944,183 | 7/1990 | Masumoto et al. | 505/847 |

FOREIGN PATENT DOCUMENTS

| 0076120 | 4/1983 | European Pat. Off. | 73/304 R |
| 0071914 | 5/1980 | Japan | 73/304 R |
| 0093024 | 7/1980 | Japan | 73/304 R |
| 0103324 | 8/1981 | Japan | 73/304 R |
| 0147018 | 11/1981 | Japan | 73/304 R |
| 0164924 | 12/1981 | Japan | 73/295 |
| 0166220 | 10/1983 | Japan | 73/295 |
| 0111926 | 6/1985 | Japan | 73/304 R |
| 0181619 | 9/1985 | Japan | 73/295 |
| 1-138423 | 5/1989 | Japan | 73/295 |
| 1-138424 | 5/1989 | Japan | 73/295 |

OTHER PUBLICATIONS

Efferson, K., "A Superconducting (Nb-Ti) Liquid Helium Level Detector", Proc. 1969 Cryogenic Engineering Conference, Los Angeles, Calif., U.S.A. (Jun. 16-18, 1969).

Permyakov, U. et al., "A Device for Controlling the Operation of a Metal Helium Cryostat", Cryogenics, vol. 12, No. 2 (Apr. 1972).

Laser Model 501-195 Specifications, Publ. 501.1.1, "Lasermike® Model 501-195 Single Axis Scanner", Laser Mike, Inc., Dayton, Ohio (May 1988).

Starrett® Mechanics' Hand Measuring Tools and Precision Instruments, p. 23; "V-Anvil Micrometer Calipers", (no date).

Primary Examiner—William A. Cuchlinski, Jr.
Assistant Examiner—Diego F. F. Gutierrez
Attorney, Agent, or Firm—Reinhart, Boerner, Van Deuren, Norris & Rieselbach

[57]               ABSTRACT

A cryogenic level sensor assembly. A sensor assembly includes a continuous length of high temperature ceramic superconductor material, an exterior housing for holding the length of ceramic superconductor material, a support material disposed between the ceramic superconductor material and the exterior housing, and a resilient retention material disposed opposite the ceramic superconductor material for holding the superconductor material while allowing expansion and contraction thereof during thermal cycling.

6 Claims, 4 Drawing Sheets

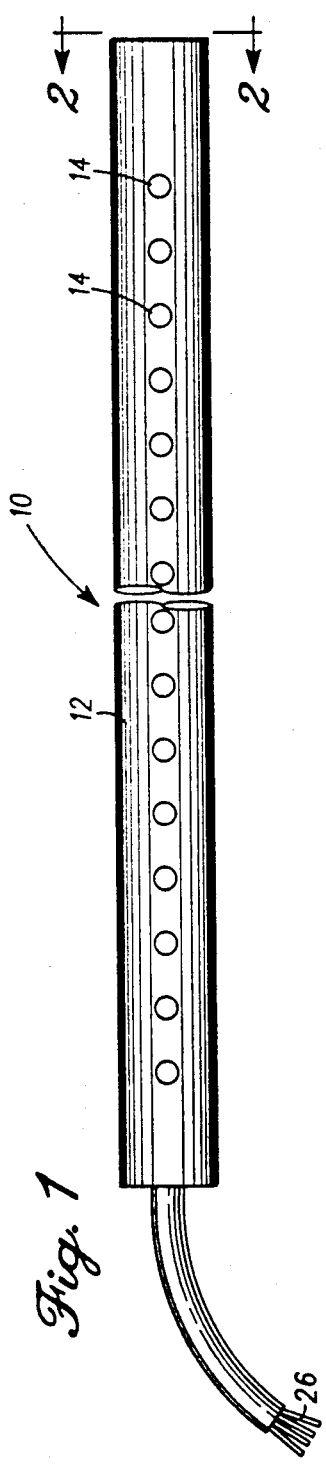
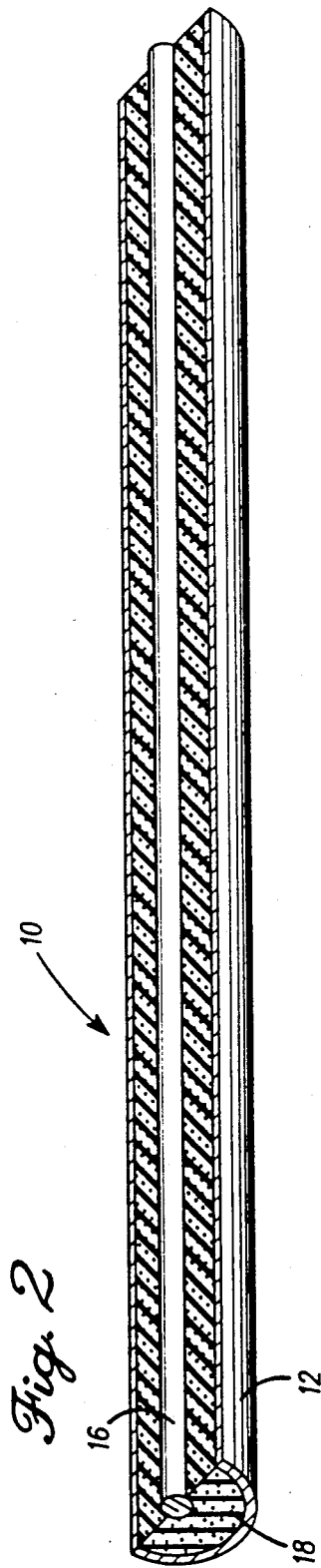
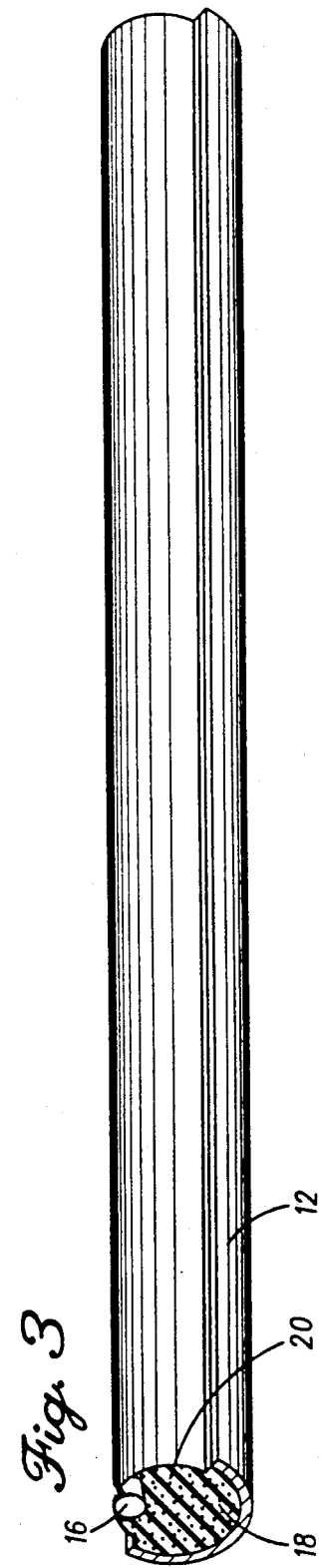

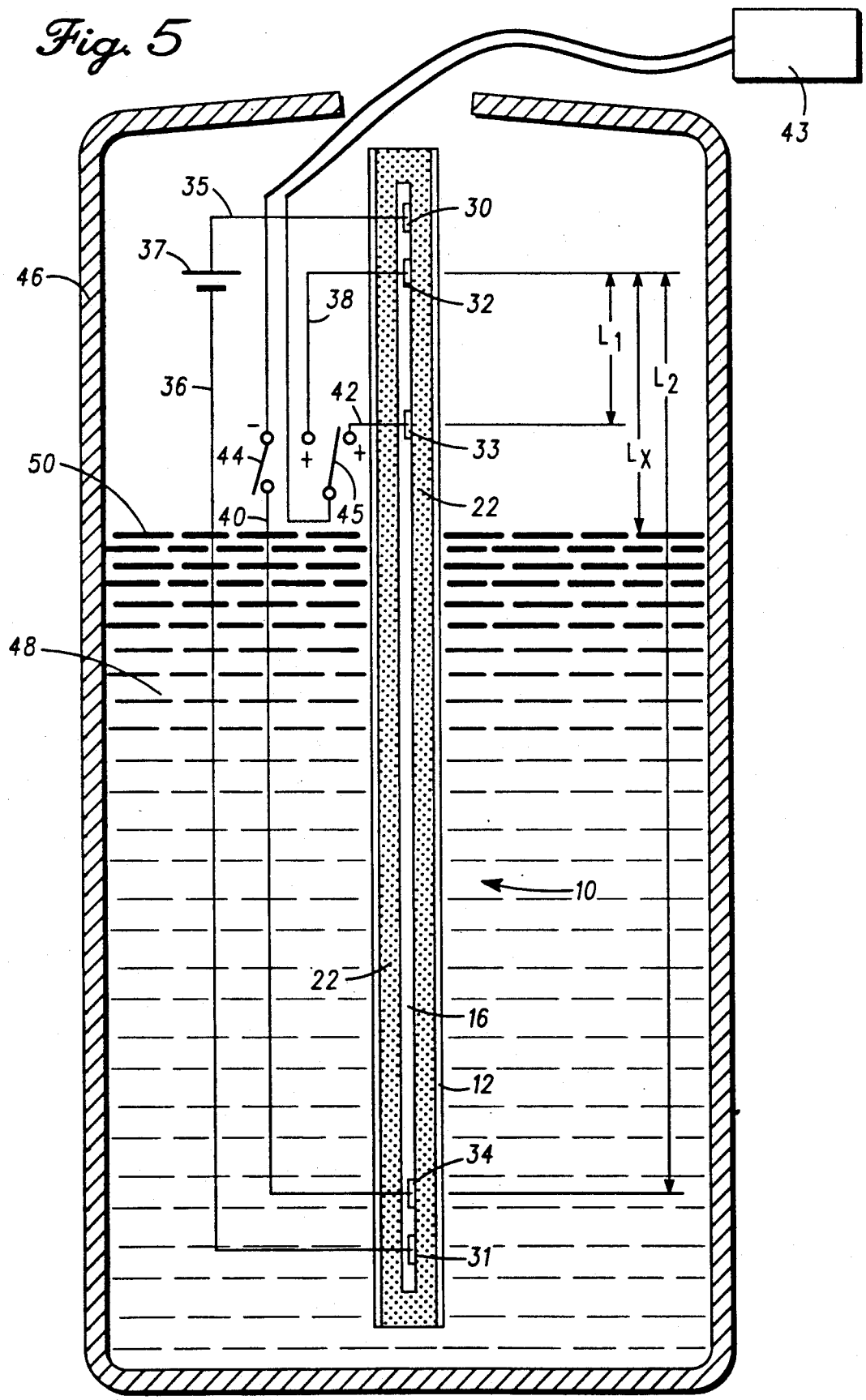

006
CRYOGENIC FLUID LEVEL SENSOR

The present invention is directed generally to a cryogenic fluid sensor for determining fluid level in a container. More particularly, the invention is directed to a cryogenic fluid level sensor constructed of a high temperature ceramic superconductor material with a set of voltage measurement leads coupled thereto for precisely indicating cryogenic fluid level in a container.

Prior art cryogenic fluid level sensors generally operate using pressure sensors, thermocouple sensors or other point sensors, such as wound resistor elements and linear carbon resistors to indicate a temperature change associated with the cryogenic fluid level dropping below the sensor location. Other sensor devices do exist which use superconducting materials having carefully controlled changing chemical composition to indicate a change in temperature above and below the superconducting critical temperature. However, such devices require preparation of precise compositional gradients, and the sensor device does not precisely measure a range of cryogenic fluid depths.

It is therefore an object of the invention to provide an improved cryogenic fluid level sensor.

It is another object of the invention to provide a novel cryogenic fluid level sensor constructed of a ceramic superconductor material.

It is a further object of the invention to provide an improved ceramic superconductor sensor for precise measurement of cryogenic fluid levels.

It is an additional object of the invention to provide a novel cryogenic fluid sensor constructed of a continous length of ceramic superconductor material.

It is still another object of the invention to provide an improved ceramic superconductor sensor having a three point voltage probe for measuring precise depths of cryogenic fluid in a container.

It is yet a further object of the invention to provide a novel ceramic superconductor sensor for establishing cryogenic fluid levels in terms of two measured voltage drops over selected lengths of the sensor.

It is still another object of the invention to provide a cryogenic fluid level sensor calibrated to account for variable head space temperature gradients in a cryogenic fluid container.

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

BRIEF DESCRIPTION OF THE DRAWINGS

FIG. 1 shows a cryogenic fluid level sensor encased in a housing;

FIG. 2 illustrates a longitudinal perspective cross section taken along 2—2 in FIG. 1 for a first embodiment of the ceramic superconductor sensor;

FIG. 3 shows a partially assembled ceramic superconductor sensor disposed in a foam mound;

FIG. 5 shows a continuous length ceramic superconductor and associated current/voltage sensor connections;

DETAILED DESCRIPTION OF PREFERRED EMBODIMENTS

Figure 4:
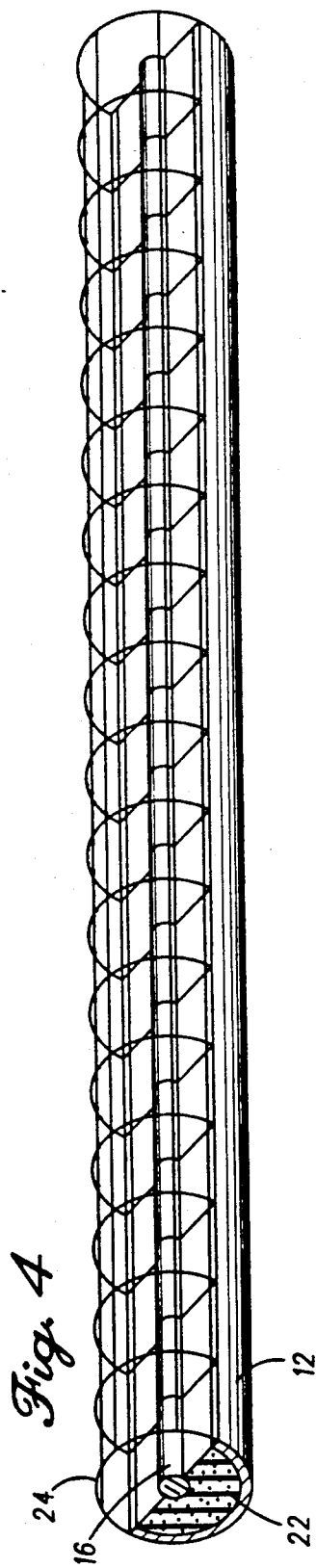
FIG. 4 illustrates a partially assembled ceramic superconductor sensor in a foam bed and overlying resilient mesh.

A cryogenic level sensor constructed in accordance with the invention is generally indicated at 10 in the figures. In FIG. 1 is a completely assembled form of the cryogenic level sensor 10 (hereinafter "sensor 10"), including an outer casing 12 with access ports 14 through which the cryogenic fluid flows into contact with a superconducting rod 16 shown in FIG. 2. The superconducting rod 16 (hereinafter "rod 16") is a continuous length of ceramic material having a high critical temperature, typically about 85°-110° K. for known ceramic superconductors, such as YBaCuO or BaSrLaCuO (see, for example, U.S. Pat. No. 4,943,559 which is incorporated by reference herein).

The rod 16 can be on a support bed 18 with an adhesive holding the rod 16 firmly in place. A variation on this approach of FIG. 2 is the structure shown in FIG. 3, wherein the support bed 18 has an additional polyurethane foam mound 20 which receives the rod 16 within a channel in the mound 20.

In another embodiment shown in FIG. 4, the length of the rod 16 is substantial and the structure to accommodate the length is thus different. It is preferable for such a structure to position the rod 16 loosely on the foam bed 22, or in a recessed channel of the foam bed, with a resilient mesh material 24 stretched over the rod 16 and affixed to the sides of the foam bed 22. The resilient mesh material 24 (for example, nylon mesh or equivalent) operates as a means for elastically retaining the rod 16 without breakage or positional shifting of the rod 16 during cycling of the temperatures from the cryogenic fluid temperature range to room temperature.

The sensor 10 is shown in FIG. 5 but the outer casing 12 is partially removed for clarity in the drawing. The drawing also does not show voltage/current exterior leads 26 which are shown in FIG. 1. The rod 16 is shown positioned in the foam bed 22, and attached to the rod 16 are electrical current contacts 30, 31 and voltage contacts 32, 33 and 34. These contacts 30-34 can be established by use of conventional means, such as conducting epoxies. Electrical current leads 35 and 36 allow application of electrical current from an electrical energy source, such as battery 37. Electrical voltage leads 38, 40 and 42 are used to measure the voltage drop over selected lengths of the rod 16. The voltage leads 38 and 42 are used with any one of a variety of conventional voltage measurement and analysis devices depicted as component 43. Switches 44 and 45 are operated to selectively measure the voltage drop along the rod 16 between the voltage contacts 32 and 34. The voltage leads 38 and 42 are also used, in the same a manner as the voltage leads 40 and 42, to measure for selected associated lengths (see next paragraph) the voltage drop along the rod 16 between the voltage contacts 32 and 33.

The distance between the voltage contacts 32 and 33 is a precisely measured distance $L_1$, while the distance between the voltage contacts 32 and 34 need not be a precisely measured distance $L_2$. Since the rod 16 is a superconducting material, any part of the rod 16 which is in a superconducting state will have zero resistance. Therefore, the portion which is not at a temperature below the superconducting critical temperature, Tc, will exhibit a conventional resistance behavior. In the case of a ceramic superconductor having the composition $YBa_2Cu_3O_{7-x}$, the resistance behavior is a weak function of temperature above $T_c$ (see FIG. 6).

As a consequence of this resistance behavior (zero when below $T_c$ and finite known resistance above $T_c$), one can readily measure the level of cryogenic fluid in which the sensor 10 is immersed. For example, as shown in FIG. 5, container 46 has cryogenic fluid 48 with an upper level 50. The position of the upper level 50 is at distance $L_x$ below the voltage contact 32. Since the portion of the rod 16 above the upper level 50 is not superconducting, the resistance is a finite value characteristic of length $L_x$. For example, if the voltage drop for distance $L_1$ is 1 volt and the measured voltage drop $V_x$ between voltage contact 32 and 34 is 1.5 volts, we know that $L_x$ is 1.5 times $L_1$. This must be so because the remainder of the length of the rod 16 immersed in the cryogenic fluid 48 has zero resistance. Consequently, in order to measure the position of the upper level 50, one only needs to make two voltage measurements and know the length $L_1$. This voltage information therefore can be used to measure the position of the upper level 50 relative to the voltage contacts 32, 33. In addition, one can activate selected devices, such as cryogenic fluid filling means, to add cryogenic fluid to the container 46, when the voltage values $V_x$ reaches a preset value characteristic of a low fluid level.

In another form of the invention the voltage $V_1$ can be a precalibrated value for a range of selected lead space temperature and known operating conditions for the particular container 46 being used. One then need only measure $V_x$; and using conventional voltage measuring electronics, one can continuously determine length L without having to measure real time $V_1$ values.

In order to improve the precision of the sensor 10, one can also correct for variable temperature along the length of the rod 16 arising from the variable behavior of resistance as a function of temperature and as a function of extreme operating conditions, such as when the container 46 is opened to ambient causing a very large temperature gradient along $L_x$ and $L_1$. Calibration measurements of the temperature along the rod 16 can be based upon the weak resistance relationship determined for each superconducting sensor rod 16. The resistance change with length along the length of the rod 16 above the upper level 50 can be characterized as follows:

(1) $R = C_1 + C_2 T$ where $C_1 \cong 0.6$ and $C_2 \cong 0.004$ for one material batch of the YBaCuO system (2) $dR/dL = \text{const } dT/dL$ Using these equations, corrections can be made to the basic assumption that $L_x$ is equal to $L_1 (V_x/V_1)$. That is, as the level of the cryogenic fluid 48 falls below the voltage contact 33, the temperature just above the upper level 50 remains at the boiling point of the cryogenic fluid 48. However, the temperature at the upper voltage contact 32 is variable depending on the particular position of the upper level 50 of the cryogenic fluid 48. As the cryogenic fluid level 50 extends farther from the upper voltage contact 32, the resistance per unit length over the length $L_x$ increases, as does the actual $V_x$, in accordance with equation (1). Therefore, the integrated resistance, and resulting measured actual voltage $V_x$, is precisely characterizable in terms of the length $L_x$ accounting for this variable resistance. For extremely accurate measurements a complete calibration can be determined for the container 46 in which the sensor 10 is used.

Figure 6:
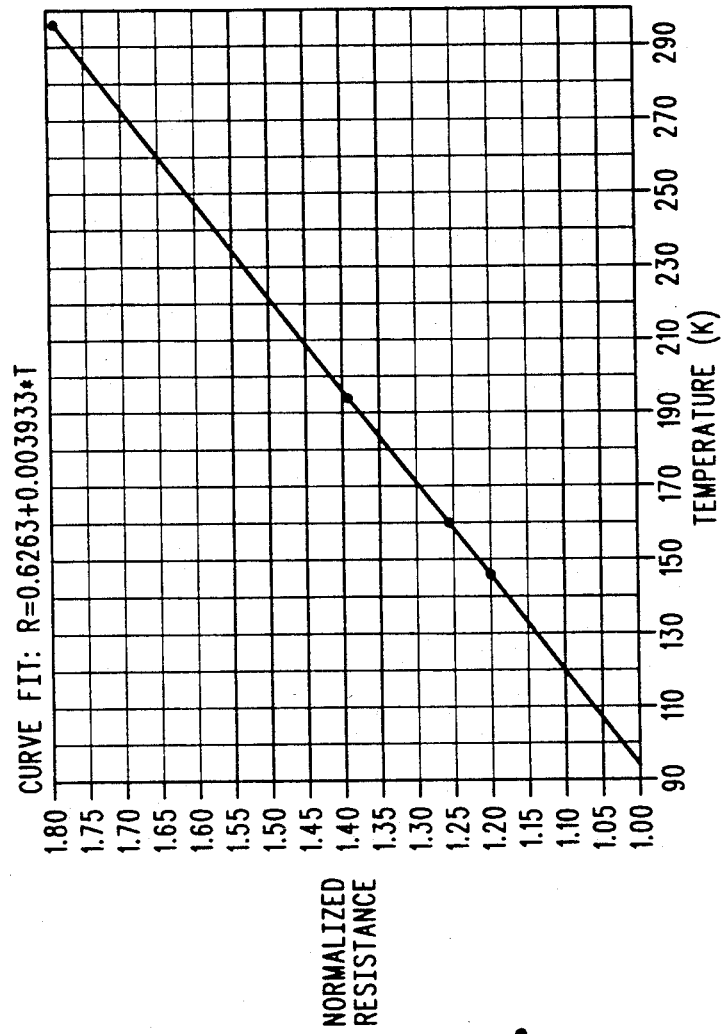
FIG. 6 shows a plot of cryogenic level sensor resistance versus temperature (° K) for a ceramic superconductor.

It is usually unnecessary to use the above described resistance correction methodology if $L_x$ is only fractionally greater than the length $L_1$. As shown in FIG. 6, the change in resistance is normally a slowly changing monotonic function such that small temperature deviations do not cause significant errors in the determined $L_x$. However, if the resistance behavior is much more sensitive to temperature, or a user wishes to measure $L_x$ values which are much greater than $L_1$, or the lead space temperature is much greater than normally is the case, this correction should preferably be applied.

Figure 7:
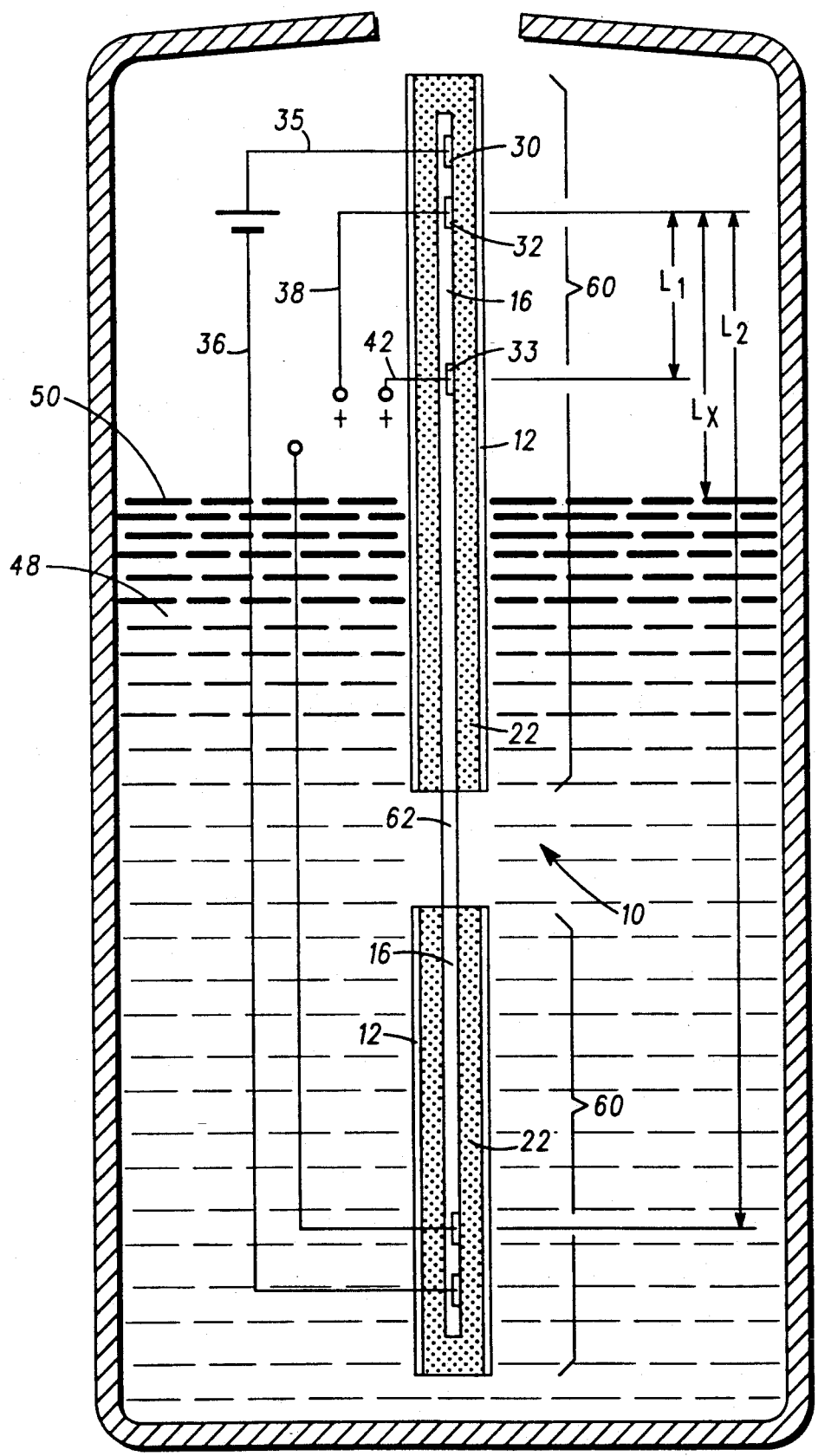
FIG. 7 illustrates a discontinuous, plural link of ceramic superconductor rods and associated current/voltage sensor connections.

In another form of the invention shown in FIG. 7 the superconducting rod 16 need not be continuous. As shown, the rod 16 can comprise discontinuous sections 60 wherein a plurality of the rods 16 are connected by a normal metal connector 62. In such an embodiment the measured voltage drop $V_x$ could include the resistance of the metal connector 62 and conventional voltage signal manipulation could allow subtraction of the metal connector resistance and use of the previously described relationships between $V_x/V_1$ and $L_x/L_1$.

While preferred embodiments of the invention have been shown and described, it will be clear to those skilled in the art that various changes and modifications can be made without departing from the invention in its broader aspects as set forth in the claims provided hereinafter.

What is claimed:

1. A cryogenic level sensor assembly, comprising:
   a continuous length of high temperature ceramic superconductor material providing an indication of the level of cryogenic fluid as determined by the length of fluid in contact with said ceramic superconductor material;
   an exterior housing disposed apart from and at least partly around said ceramic superconductor material for holding said length of ceramic superconductor material;
   a support material disposed between said ceramic superconductor material and said exterior housing; and
   a resilient retention material disposed opposite said exterior housing and opposite said ceramic superconductor material for holding said superconductor material while allowing expansion and contraction thereof during thermal cycling.

2. The cryogenic level sensor as described in claim 1 wherein said support material includes a recessed channel for receiving said ceramic superconductor material.

3. The cryogenic level sensor assembly as defined in claim 1 wherein said support material comprises a foamed polymer.

4. The cryogenic level sensor assembly as defined in claim 1 wherein said support material comprises polyurethane.

5. They cryogenic level sensor assembly as defined in claim 1 wherein said resilient retention material comprises a fabric.

6. The cryogenic level sensor assembly as defined in claim 1 wherein said resilient retention material comprises a nylon mesh.

* * * * *